United States Patent
Zhang et al.

(10) Patent No.: US 12,214,336 B2
(45) Date of Patent: Feb. 4, 2025

(54) METAL-FREE FEW-LAYER PHOSPHOROUS NANOMATERIAL: METHOD FOR ITS PREPARATION AND USE THEREOF

(71) Applicant: INSTITUT NATIONAL DE LA RECHERCHE SCIENTIFIQUE, Quebec (CA)

(72) Inventors: Qingzhe Zhang, Longueuil (CA); Dongling Ma, Pointe-Claire (CA); Mohamed Chaker, Montreal (CA)

(73) Assignee: INSTITUT NATIONAL DE LA RECHERCHE SCIENTIFIQUE, Quebec (CA)

( * ) Notice: Subject to any disclaimer, the term of this patent is extended or adjusted under 35 U.S.C. 154(b) by 0 days.

(21) Appl. No.: 18/442,745

(22) Filed: Feb. 15, 2024

(65) Prior Publication Data

US 2024/0307857 A1    Sep. 19, 2024

Related U.S. Application Data

(62) Division of application No. 17/045,570, filed as application No. PCT/CA2019/050813 on Jun. 10, 2019, now abandoned.

(Continued)

(51) Int. Cl.
| | |
|---|---|
| *B01J 27/00* | (2006.01) |
| *B01J 27/14* | (2006.01) |
| *B01J 27/24* | (2006.01) |
| *B01J 35/39* | (2024.01) |
| *B01J 37/00* | (2006.01) |
| *B01J 37/04* | (2006.01) |

(Continued)

(52) U.S. Cl.
CPC ............ *B01J 27/14* (2013.01); *B01J 27/24* (2013.01); *B01J 35/39* (2024.01); *B01J 37/0072* (2013.01); *B01J 37/009* (2013.01); *B01J 37/04* (2013.01); *B01J 37/06* (2013.01); *C01B 3/042* (2013.01); *C01B 25/02* (2013.01); *C01P 2002/72* (2013.01); *C01P 2004/24* (2013.01)

(58) Field of Classification Search
None
See application file for complete search history.

(56) References Cited

U.S. PATENT DOCUMENTS

2017/0253486 A1    9/2017    Hersam et al.

FOREIGN PATENT DOCUMENTS

CN    108046250 A    *    5/2018    ............ B82Y 40/00

OTHER PUBLICATIONS

CN-108046250-A, English translation (Year: 2018).*

(Continued)

*Primary Examiner* — Stefanie J Cohen
(74) *Attorney, Agent, or Firm* — Lavery, de Billy, L.L.P.; Beatrice Ngatcha

(57) ABSTRACT

A method for preparing a metal-free few-layer phosphorous nanomaterial. The method comprises an ice-assisted exfoliation process (or solvent ice-assisted exfoliation process). The method allows for the preparation of a few-layer phosphorous nanomaterial with improved yield and reduced duration and exfoliation power. The few-layer phosphorous nanomaterial is used in the preparation of a photocatalyst. The photocatalyst exhibits a long-term stability, high photocatalytic $H_2$ evolution efficiency from water, and good stability under visible light irradiation.

15 Claims, 6 Drawing Sheets

Related U.S. Application Data

(60) Provisional application No. 62/685,371, filed on Jun. 15, 2018.

(51) Int. Cl.
  *B01J 37/06* (2006.01)
  *C01B 3/04* (2006.01)
  *C01B 25/02* (2006.01)

(56) References Cited

OTHER PUBLICATIONS

The role of water in the preparation and stabilization of high quality phospherene flakes, adv. mater. interfaces, 3, pp. 1-8 (Year: 2016).*
A. Fujishima, K. Honda, "Electrochemical Photolysis of Water at a Semiconductor Electrode"; Nature 1972, 238, 37-38.
Maeda et al., "Photocatalyst releasing hydrogen from water"; Nature 2006, 440, 295-295.
Kudo A., Miseki Y., "Heterogeneous photocatalyst materials for water splitting"; Chem. Soc. Rev. 2009, 38, 253-278.
Zhang et al., "Recent advancements in plasmon-enhanced visible light-driven water splitting"; J. Materiomics 2017, 3, 33-50.
Wang et al., "A metal-free polymeric photocatalyst for hydrogen production from water under visible light"; Nat. Mater. 2009, 8, 76-80.
Zhang et al., "Conjugated Polymers: Catalysts for Photocatalytic Hydrogen Evolution"; Angew. Chem. Int. Ed. 2016, 55, 15712-15727.
Yang et al., "Carbon Nitride Aerogels for the Photoredox Conversion of Water"; Angew. Chem. Int. Ed. 2017, 56, 10905-10910.
Zheng et al., "Precise Formation of a Hollow Carbon Nitride Structure with a Janus Surface To Promote Water Splitting by Photoredox Catalysis"; Angew. Chem. Int. Ed. 2016, 55, 11512-115.
Zhang et al., "Synthesis of a Carbon Nitride Structure for Visible-Light Catalysis by Copolymerization"; Angew. Chem. Int. Ed. 2010, 49, 441-444.
Chen et al., "Fe-g-C3N4-Catalyzed Oxidation of Benzene to Phenol Using Hydrogen Peroxide and Visible Light"; Adv. Funct. Mater. 2016, 26, 4943-4950.
Sun et al., "Freestanding Graphitic Carbon Nitride Photonic Crystals for Enhanced Photocatalysis"; Adv. Funct. Mater. 2016, 26, 4943-4950.
Moudrakovski et al., "Rational design of carbon nitride photocatalysts by identification of cyanamide defects as catalytically relevant sites"; Nat. Commun. 2016, 7.
Ong et al., "Graphitic Carbon Nitride (g-C3N4)-Based Photocatalysts for Artificial Photosynthesis and Environmental Remediation: Are We a Step Closer To Achieving Sustainability?"; Chem. Rev. 2016, 116, 7159-7329.
Fu et al., "g-C3N4-Based Heterostructured Photocatalysts"; Adv. Energy Mater. 2017, 1701503.
Deng et al., "Black Phosphorus Monolayer MoS2 van der Waals Heterojunction p n Diode"; ACS Nano 2014, 8, 8292-8299.
Li et al., "Black phosphorus field-effect transistors"; Nat. Nanotechnol. 2014, 9, 372-377.
Liu et al., "Phosphorene: An Unexplored 2D Semiconductor with a High Hole Mobility"; ACS Nano 2014, 8, 4033-4041.
E. S. Reich, "Phosphorene excites materials scientists"; Nature 2014, 506, 19.
Xia et al., "Two-dimensional material nanophotonics"; Nat. Photonics 2014, 8, 899-907.
Ling et al., "The renaissance of black phosphorus"; PNAS 2015, 112, 4523-4530.
Kou et al., "Phosphorene: Fabrication, Properties, and Applications"; J. Phys. Chem. Lett. 2015, 6, 2794-2805.
Liu et al., "Semiconducting black phosphorus: synthesis, transport properties and electronic applications"; Chem. Soc. Rev. 2015, 44, 2732-2743.
Ryder et al., "Covalent functionalization and passivation of exfoliated black phosphorus via aryl diazonium chemistry"; Nat. Chem. 2016, 8, 598-603.
Xia et al., "Rediscovering black phosphorus as an anisotropic layered material for optoelectronics and electronics"; Nat. Commun. 2014, 5, 4458.
Buscema et al., "Fast and Broadband Photoresponse of Few-Layer Black Phosphorus Field-Effect Transistors"; Nano Lett. 2014, 14, 3347-3352.
Sun et al., "Formation of Stable Phosphorus-Carbon Bond for Enhanced Performance in Black Phosphorus Nanoparticle—Graphite Composite Battery Anodes"; Nano Lett. 2014, 14, 4573-4580.
Wang et al., "Ultrathin Black Phosphorus Nanosheets for Efficient Singlet Oxygen Generation"; J. Am. Chem. Soc. 2015, 137, 11376-11382.
Sun et al., "Ultrasmall Black Phosphorus Quantum Dots: Synthesis and Use as Photothermal Agents"; Angew. Chem. Int. Ed. 2015, 54, 11526-11530.
Zhang et al., "Black Phosphorus Quantum Dots"; Angew. Chem. Int. Ed. 2015, 54, 3653-3657.
Yang et al., "Black Phosphorus Based Photocathodes in Wideband Bifacial Dye-Sensitized Solar Cells"; Adv. Mater. 2016, 28, 8937-8944.
Rahman et al., "2D phosphorene as a water splitting photocatalyst: fundamentals to applications"; Energy Environ. Sci. 2016, 9, 709-728.
Lei et al., "Bandgap- and Local Field-Dependent Photoactivity of Ag/Black Phosphorus Nanohybrids"; ACS Catal. 2016, 6, 8009-8020.
Zhu et al., "Metal-Free Photocatalyst for H2 Evolution in Visible to Near-Infrared Region: Black Phosphorus/Graphitic Carbon Nitride"; J. Am. Chem. Soc. 2017, 139, 13234-13242.
Zhu et al., "Au/La2Ti2O7 Nanostructures Sensitized with Black Phosphorus for Plasmon-Enhanced Photocatalytic Hydrogen Production in Visible and Near-Infrared Light"; Angew. Chem. Int. Ed. 2017, 56, 2064-2068.
Zhu et al., "Black Phosphorus Revisited: A Missing Metal-Free Elemental Photocatalyst for Visible Light Hydrogen Evolution"; Adv. Mater. 2017, 29.
Hu et al., "Highly Efficient Photocatalytic Water Splitting over Edge-Modified Phosphorene Nanoribbons"; J. Am. Chem. Soc. 2017, 139, 15429-15436.
Woomer et al., "Phosphorene: Synthesis, Scale-Up, and Quantitative Optical Spectroscopy"; ACS Nano 2015, 9, 8869-8884.
Ziletti et al., "Oxygen Defects in Phosphorene"; Phys. Rev. Lett. 2015, 114, 046801.
Kang et al., "Solvent Exfoliation of Electronic-Grade, Two-Dimensional Black Phosphorus"; ACS Nano 2015, 9, 3596-3604.
Favron et al., "Photooxidation and quantum confinement effects in exfoliated black phosphorus"; Nat. Mater. 2015, 14, 826-832.
A. Hirsch, F. Hauke, "Post-Graphene 2D Chemistry: The Emerging Field of Molybdenum Disulfide and Black Phosphorus Functionalization"; Angew. Chem. Int. Ed. 2017, 57, 4338-4354.
Wood et al., "Effective Passivation of Exfoliated Black Phosphorus Transistors against Ambient Degradation"; Nano Lett. 2014, 14, 6964-6970.
Doganov et al., "Transport properties of pristine few-layer black phosphorus by van der Waals passivation in an inert atmosphere"; Nat. Commun. 2015, 6.
Zhu et al., "Flexible Black Phosphorus Ambipolar Transistors, Circuits and AM Demodulator"; Nano Lett. 2015, 15, 1883-1890.
Zhao et al., "Surface Coordination of Black Phosphorus for Robust Air and Water Stability"; Angew. Chem. Int. Ed. 2016, 55, 5003-5007.
Brent et al., "Production of few-layer phosphorene by liquid exfoliation of black phosphorus"; Chem. Commun. 2014, 50, 13338-13341.
Yasaei et al., "High-Quality Black Phosphorus Atomic Layers by Liquid-Phase Exfoliation"; Adv. Mater. 2015, 27, 1887-1892.
Chen et al., "Scalable Clean Exfoliation of High-Quality Few-Layer Black Phosphorus for a Flexible Lithium Ion Battery"; Adv. Mater. 2016, 28, 510-517.

(56) References Cited

OTHER PUBLICATIONS

Batmunkh et al., "Solution processed graphene structures for perovskite solar cells"; J. Mater. Chem. A 2016, 4, 2605-2616.

Zhang et al., "High-Efficiency Broadband C3N4 Photocatalysts: Synergistic Effects from Upconversion and Plasmons"; ACS Catal. 2017, 7, 6225-6234.

Xu et al., "Towards enhancing photocatalytic hydrogen generation: Which is more important, alloy synergistic effect or plasmonic effect?"; Appl. Catal., B 2018, 221, 77-85.

Dong et al., "In Situ Construction of g-C3N4/g-C3N4 Metal-Free Heterojunction for Enhanced Visible-Light Photocatalysis"; ACS Appl. Mater. Interfaces 2013, 5, 11392-11401.

Cao et al., "Vacuum heat-treatment of carbon nitride for enhancing photocatalytic hydrogen evolution"; J. Mater. Chem. A 2014, 2, 17797-17807.

Liu et al., "Metal-free efficient photocatalyst for stable visible water splitting via a two-electron pathway"; Science 2015, 347, 970-974.

Kong et al., "Sulfur-Doped g-C3N4/BiVO4 Composite Photocatalyst for Water Oxidation under Visible Light"; Chem. Mater. 2016, 28, 1318-1324.

Ye et al., "Enhanced Driving Force and Charge Separation Efficiency of Protonated g-C3N4 for Photocatalytic O2 Evolution"; ACS Catal. 2015, 5, 6973-6979.

Zhang et al., "Engineering monomer structure of carbon nitride for the effective and mild photooxidation reaction"; Carbon 2016, 100, 450-455.

Peng et al., "A General Synthesis of Porous Carbon Nitride Films with Tunable Surface Area and Photophysical Properties"; Angew. Chem. Int. Ed. 2017, 56, 1-7.

Yu et al., "Alkali-Assisted Synthesis of Nitrogen Deficient Graphitic Carbon Nitride with Tunable Band Structures for Efficient Visible-Light-Driven Hydrogen Evolution"; Adv. Mater. 2017, 29, 1605148.

Zhu et al., "Z-Scheme Photocatalytic Water Splitting on a 2D Heterostructure of Black Phosphorus/Bismuth Vanadate Using Visible Light"; Chem. Int. Ed. 2018, 57, 1-6.

Martin et al., "Visible Light-Driven Pure Water Splitting by a Nature-Inspired Organic Semiconductor-Based System"; J. Am. Chem. Soc. 2014, 136, 12568-12571.

Han et al., "Atomically Thin Mesoporous Nanomesh of Graphitic C3N4 for High-Efficiency Photocatalytic Hydrogen Evolution"; ACS Nano 2016, 10, 2745-2751.

Li et al., "A Co-catalyst-Loaded Ta3N5 Photoanode with a High Solar Photocurrent for Water Splitting upon Facile Removal of the Surface Layer"; Angew. Chem. Int. Ed. 2013, 52, 11016-11020.

Shi et al., "Semiconductive Copper(I)-Organic Frameworks for Efficient Light-Driven Hydrogen Generation Without Additional Photosensitizers and Cocatalysts"; Angew. Chem. Int. Ed. 2017, 56, 14637-14641.

International Searching Authority, Application No. PCT/CA2019/050813; International Seach Report and Written Opinion issued on Aug. 15, 2019.

Backes et al., "Guidelines for Exfoliation, Characterization and Processing of Layered Materials Produced by Liquid Exfoliation"; Chem. Mater. 2017, 29, 243-255.

Yan et al., "Solvothermal-assisted liquid-phase exfoliation of large size and high quality black phosphorus"; J. Materiomics 4 (2018) 129-134.

Lin et al., "Liquid-phase exfoliation of black phosphorus and its applications"; Flat Chem 2 (2017) 15-37.

Zhang et al., "Ice-Assisted Synthesis of Black Phosphorus Nanosheets as a Metal-Free Photocatalyst: 2D/2D Heterostructure for Broadband H2 Evolution"; Adv. Funct. Mater. 2019, 1902486.

\* cited by examiner

METAL-FREE FEW-LAYER PHOSPHOROUS NANOMATERIAL: METHOD FOR ITS PREPARATION AND USE THEREOF

CROSS REFERENCE TO RELATED APPLICATIONS

This application is a divisional of U.S. application Ser. No. 17/045,570, filed Jun. 10, 2019, now abandoned, which claims the priority benefit of U.S. Provisional Patent Application No. 62/685,371, filed on Jun. 15, 2018, the content of which is incorporated herein in its entirety by reference.

FIELD OF THE INVENTION

The present invention relates generally to few-layer phosphorous nanomaterials. More specifically, the present invention relates to a metal-free few-layer black phosphorous (BP) nanomaterial. The method for its preparation comprises an ice-assisted exfoliation process. The BP nanomaterial according to the invention may be used, among others, in the development of photocatalysts.

BACKGROUND OF THE INVENTION

Solar water splitting for $H_2$ evolution has shown great potential as a green technology in solving energy crisis [1]. Taking economic and environmental factors into consideration, the development of efficient, low-cost, stable and nontoxic photocatalyst is highly desired for a widespread implementation of solar fuel technology. In this regard, visible-light-responsive graphitic carbon nitride (g-$C_3N_4$), a two-dimensional (2D) metal-free photocatalyst, has been extensively explored in photocatalysis. Though g-$C_3N_4$ was discovered to be feasible for photocatalytic water splitting, achieving an acceptable efficiency in $H_2$ evolution still relies largely on the loading of noble metal co-catalysts. This is necessary because of the high recombination rate of the charge carriers in g-$C_3N_4$ [2]. Furthermore, the relatively wide bandgap (2.7 eV) confines its light response mainly into the ultraviolet (UV) range and only slightly into a small portion of the visible light range ($\lambda<460$ nm) [3]. To solve these problems, numerous strategies have been developed, mainly including morphology tuning, doping with metal/non-metal ions, and heterojunction creation [4]. However, quite limited progresses have been achieved thus far. Aiming to enhance the harvesting of solar light efficiently and economically, the development of g-$C_3N_4$-based metal-free photocatalysts with a broader photo-response range is of great significance.

Black phosphorus (BP), a layered material that consists of corrugated atomic planes with strong intra-layer chemical bonding and weak interlayer Van der Waals interactions, has attracted the interest of material scientists. Since the successful preparation of 2D BP with atom-thick layer in early 2014, it has provoked a surge of research with its enticing electrical and optical properties [5]. Differentiating from previously reported 2D nanomaterial such as graphene, BP possesses a tunable thickness-dependent bandgap that spans from about 0.3 eV (bulk) to about 2.0 eV (monolayer) in addition to sufficiently high carrier mobility and photoelectronic response [5b-d, 5f, 5g, 5i]. These favorable properties render BP, particularly few-layer BP nanosheets ($\leq 10$ nm in thickness), a good candidate for diverse applications in transistor and photodetector devices, solar cells, bioimaging and phototherapy [5i, 6]. Notably, BP has demonstrated its great potential as a broadband photocatalyst for the harvesting of solar energy due to its narrow and direct bandgap [7].

However, certain inherent problems existing in the typical, exfoliated BP nanosheets bring practical challenges for its actual application. For example, BP is very reactive to moisture and ambient oxygen, and can be easily oxidized due to the exposed lone pairs at its surface [5f, 6e, 7e, 8]. The roughening caused by the exfoliation can further accelerate the surface oxidation, which may proceed exponentially during the first hour after exfoliation [8b]. As a consequence, the semiconducting properties of BP deteriorate rapidly, reflected from significantly increased contact resistance and reduced carrier mobility [8a, 8b, 8e]. It is thus importance to develop effective strategies to retard or eliminate the degradation of BP.

Recently, several approaches were developed to protect BP from oxidation with various levels of success [5i, 9]. Among these approaches, the non-covalent surface coverage of BP with other inert 2D materials, such as poly (methyl methacrylate), graphene or hexagonal boron nitride, was proposed [8e, 9b].

For the preparation of few-layer BP nanosheets, the mechanical and liquid exfoliation from bulk BP is known in the art [8a, 8c, 10]. As BP possesses stronger interlayer interactions compared to graphene or other 2D materials, the exfoliation by ultrasonication would be difficult and would require a long processing time (>15 hours), or would require a sonicator with high power [8a, 8c, 10]. The yield obtained for the preparation of few-layer BP nanosheets is still low [8a, 10c]. As the P—P bond is weaker than the C—C bond, such long duration or high power of sonication are known to generate nanosheets with reduced lateral size and structural defects [8a, 11]. In addition to the instability, such structural defects also restrict the practical applications of BP obtained by these methods.

There is a need for few-layer phosphorous nanomaterials that are stable, that have structures free of defects, and that are environment-friendly. There is a need for efficient methods for the preparation of such few-layer phosphorous nanomaterials.

SUMMARY OF THE INVENTION

The inventors have designed and performed a method for preparing a metal-free few-layer phosphorous nanomaterial. The method comprises an ice-assisted exfoliation process (or solvent ice-assisted exfoliation process). The method according to the invention is novel, and allows for the preparation of a few-layer phosphorous nanomaterial with improved yield and reduced duration and exfoliation power.

In embodiments of the invention, the inventors have designed and performed a method for preparing a metal-free few-layer black phosphorous (BP) nanomaterial. In these embodiments, the ice-assisted exfoliation process involves use of a solvent. Preferably, the solvent is an organic solvent, for example N-methyl-2-pyrrolidone (NMP).

In other embodiments of the invention, a photocatalyst is prepared. In these embodiments, the few-layer BP nanomaterial and graphitic carbon nitride (g-$C_3N_4$) are integrated into a single, 2D-on-2D architecture (BP/g-$C_3N_4$). The thus-obtained metal-free BP/g-$C_3N_4$ photocatalyst exhibits a long-term stability, high photocatalytic $H_2$ evolution efficiency from water, and good stability under visible light irradiation.

The invention thus provides the following according to aspects thereof:

(1) Method for preparing a few-layer phosphorous nanomaterial from a bulk layer-structured phosphorous material, comprising an ice-assisted exfoliation process or solvent ice-assisted exfoliation process.

(2) Method for preparing a few-layer phosphorous nanomaterial from a bulk layer-structured phosphorous material, comprising a combination of the following steps: grinding, dispersion in a solvent, freezing, melting, separation, purification.

(3) Method for preparing a few-layer phosphorous nanomaterial, comprising: (a) providing a bulk layer-structured phosphorous material; (b) grinding the bulk phosphorous material; (c) dispersing the grinded material into a first solvent to obtain a first dispersion; (d) freezing the first dispersion for a period of time, preferably using liquid nitrogen; (e) melting the frozen dispersion, preferably by sonication for a period of time to obtain a second dispersion; and (f) submitting the second dispersion to a separation step, preferably involving centrifugation for a period of time, to obtain the nanomaterial.

(4) Method according to (3) above, further comprising a purification step; preferably the purification step comprises: (g) washing the nanomaterial using a second solvent, optionally repeating step (g) a number of time, preferably 2-6 times, or 3 times, or 4 times; and (h) dispersing the nanomaterial into a third solvent, wherein the second and third solvents are the same or different.

(5) Method according to (3) or (4) above, wherein steps (d) and (e) are repeated a number of time, preferably 2 to 6 times, or 3 times or 4 times.

(6) Method according to (3) above, wherein the freezing time period at step (d) is about 3-15 minutes, or about 4-14 minutes, or about 5-13 minutes, or about 5-12 minutes, or about 5-11 minutes, or about 5-10 minutes, or about 6-8 minutes.

(7) Method according to (3) above, wherein the sonication time period at step (e) is about 5-15 minutes, or about 6-14 minutes, or about 7-13 minutes, or about minutes 8-12 minutes, or about 9-11 minutes, or about 10 minutes.

(8) Method according to (3) above, wherein the centrifugation at step (f) is performed at 7000 rpm and the time period is about 10-20 minutes, or about 12-18 minutes, or about 14-16 minutes, or about 15 minutes.

(9) Method according to any one of (1) to (8) above, wherein the bulk layered structure phosphorous material is black phosphorous (BP), red phosphorous (RP), violet phosphorous (VP).

(10) Method according to any one of (1) to (9) above, wherein the bulk layer-structured phosphorous material is a black phosphorous (BP) material, and the few-layer phosphorous nanomaterial is a few-layer black phosphorous (BP) nanomaterial.

(11) Method according to (1) above, wherein the solvent is an organic solvent; preferably the organic solvent is selected from the group consisting of N-methyl-2-pyrrolidone (NMP), alcohols such as methanol, ethanol and isopropanol (IPA), diethyl ether, chloroform, tetrahydrofuran, cyclohexane, toluene, dimethylformamide, and combinations thereof; more preferably the solvent is N-methyl-2-pyrrolidone (NMP).

(12) Method according to (3) or (4) above, wherein: the first solvent is selected from the group consisting of N-methyl-2-pyrrolidone (NMP), alcohols such as methanol, ethanol and isopropanol (IPA), diethyl ether, chloroform, tetrahydrofuran, cyclohexane, toluene, dimethylformamide, and combinations thereof; preferably the first solvent is N-methyl-2-pyrrolidone (NMP); the second solvent is selected from the group consisting of isopropanol (IPA), other alcohols such as methanol and ethanol; diethyl ether, chloroform, tetrahydrofuran, cyclohexane, toluene, dimethylformamide, and combinations thereof; preferably the second solvent is isopropanol (IPA); and the third solvent is selected from the group consisting of isopropanol (IPA), other alcohols such as methanol and ethanol; diethyl ether, chloroform, tetrahydrofuran, cyclohexane, toluene, dimethylformamide, N-methyl-2-pyrrolidone (NMP), and combinations thereof; preferably the second solvent is isopropanol (IPA).

(13) Method according to any one (1) to (12) above, wherein substantially no oxidation occurs.

(14) Method according to any one (1) to (12) above, wherein the few-layer phosphorous nanomaterial is metal-free.

(15) A few-layer phosphorous nanomaterial obtained by the method as defined in any one of (1) to (14) above.

(16) A few-layer black phosphorous (BP) nanomaterial obtained by the method as defined in any one of (1) to (14) above.

(17) A few-layer phosphorous nanomaterial as defined in (15) or (16) above, having 4 to 10 layers, or 5 to 9 layers, or 6 to 8 layers, or 7 layers, or 6 layers.

(18) A few-layer phosphorous nanomaterial as defined in any one of (15) to (17) above, having a thickness which is less than about 12 nm, or less than about 10 nm; or which is about 9 nm, or about 8 nm, or about 7 nm, or about 6 nm, or about 5 nm.

(19) Use of a few-layer phosphorous nanomaterial as defined in any one of (15) to (18) above, in the development of photocatalysts, transistor devices, photodetector devices, solar cells, or in bio-imaging, or in phototherapy.

(20) A method for preparing a photocatalyst, comprising coupling the few-layer phosphorous nanomaterial as defined in any one of (15) to (18) above, with a 2D material; preferably the 2D material is selected from the group consisting of poly (methyl methacrylate), graphene or hexagonal boron nitride which may be nitrogen-doped, molybdenum disulfide, a carbon nitride nanomaterial; more preferably the 2D material is graphitic carbon nitride ($g-C_3N_4$).

(21) A method for preparing a photocatalyst, comprising coupling the few-layer black phosphorous (BP) nanomaterial as defined in (20) above, with graphitic carbon nitride ($g-C_3N_4$).

(22) Use of the few-layer phosphorous nanomaterial as defined in any one of (15) to (18) above, in the preparation of a photocatalyst.

(23) Use of the few-layer black phosphorous (BP) nanomaterial as defined in (16) above, in the preparation of a photocatalyst.

(24) A photocatalyst obtained by the method as defined in (20) or (21) above.

(25) A photocatalyst obtained by the method as defined in (21) above, which is few-layer black phosphorous nanomaterial/$g-C_3N_4$.

(26) Use of the photocatalyst as defined in (24) or (25) above, for water splitting ($H_2$ evolution).

Other objects, advantages and features of the present invention will become more apparent upon reading of the following non-restrictive description of specific embodi-

DESCRIPTION OF ILLUSTRATIVE EMBODIMENTS

Figure 1:
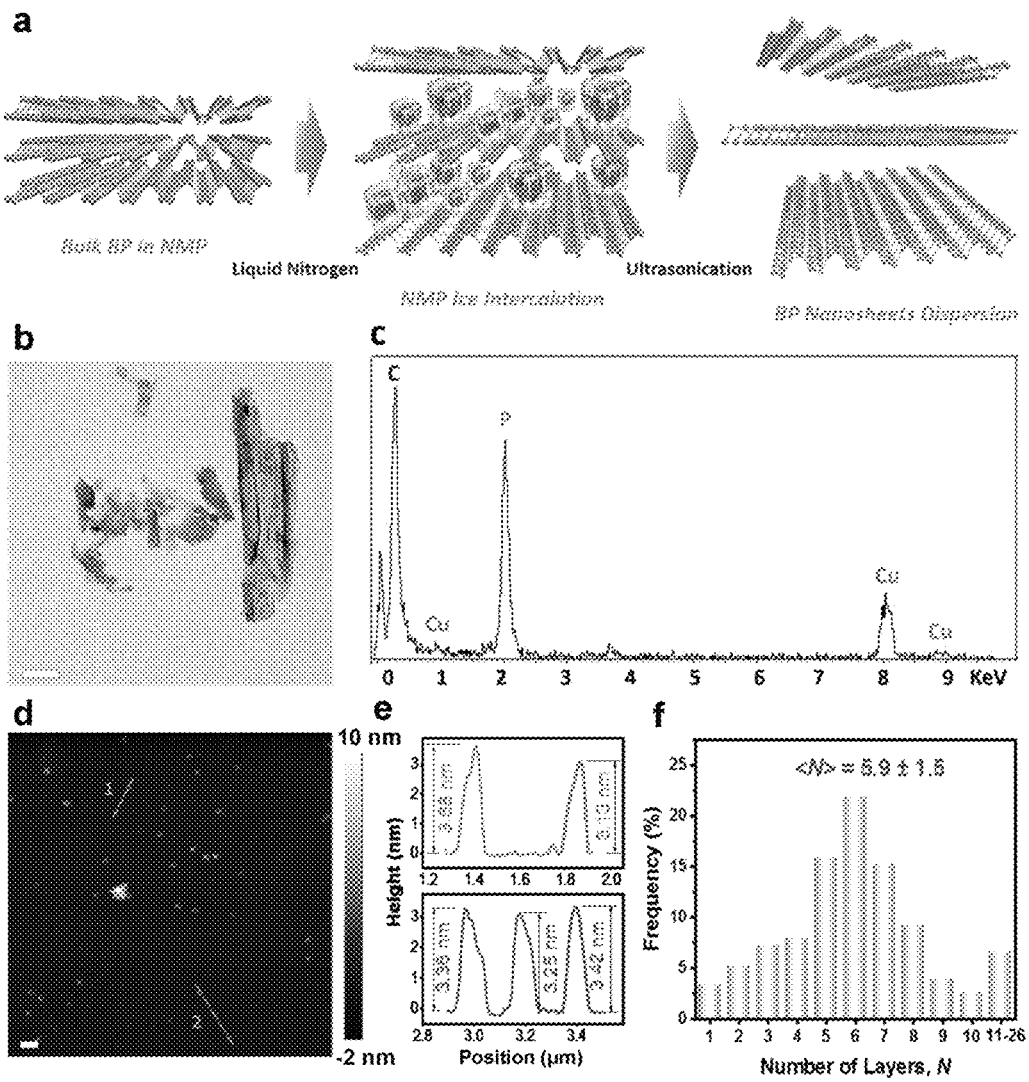
FIG. 1: (a) Schematic illustration of the preparation of BP nanosheets with ice-assisted exfoliation method. (b) TEM image of BP nanosheets and (c) EDX spectrum of (b). (d) Tapping mode AFM topographical image of few-layer BP nanosheets. Scale bars in b) and (d) are 500 nm. (e) The height profiles of BP nanosheets along the blue Line 1 and green Line 2 in (d). (f) Statistical thickness distribution calculated from the height profiles of 150 BP nanosheets in AFM images.

Before the present invention is further described, it is to be understood that the invention is not limited to the particular embodiments described below, as variations of these embodiments may be made and still fall within the scope of the appended claims. It is also to be understood that the terminology employed is for the purpose of describing particular embodiments, and is not intended to be limiting. Instead, the scope of the present invention will be established by the appended claims.

In order to provide a clear and consistent understanding of the terms used in the present specification, a number of definitions are provided below. Moreover, unless defined otherwise, all technical and scientific terms as used herein have the same meaning as commonly understood to one of ordinary skill in the art to which this disclosure pertains.

As used herein, the term "exfoliation" refers to a process which allows for the separation of layers of a layer-structured material. The process may involve dispersing the material into a solvent. The process is herein referred to as "ice-assisted exfoliation" or "solvent ice-assisted exfoliation". The expressions "ice-assisted exfoliation" and "solvent ice-assisted exfoliation" are used herein interchangeably.

As used herein the expression "few-layer black phosphorous (BP) nanomaterial" is used interchangeably with the expression "few-layer black phosphorous (BP) nanosheets" to refer to the material prepared by the method according to the invention. As will be understood by a skilled person, the "few-layer black phosphorous (BP) nanomaterial" according to the invention comprises nanosheets.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used herein when referring to numerical values or percentages, the term "about" includes variations due to the methods used to determine the values or percentages, statistical variance and human error. Moreover, each numerical parameter in this application should at least be construed in light of the number of reported significant digits and by applying ordinary rounding techniques.

The inventors have designed and performed a method for preparing a metal-free few-layer phosphorous nanomaterial. The method comprises an ice-assisted exfoliation process (or solvent ice-assisted exfoliation process). The method according to the invention is novel, and allows for the preparation of a few-layer phosphorous nanomaterial with improved yield and reduced duration and exfoliation power.

In embodiments of the invention, the inventors have designed and performed a method for preparing a metal-free few-layer black phosphorous (BP) nanomaterial. In these embodiments, the ice-assisted exfoliation process involves use of a solvent. Preferably, the solvent is an organic solvent, for example N-methyl-2-pyrrolidone (NMP).

In other embodiments of the invention, a photocatalyst is prepared. In these embodiments, the few-layer BP nanomaterial and graphitic carbon nitride (g-$C_3N_4$) are integrated into a single, 2D-on-2D architecture (BP/g-$C_3N_4$). The thus-obtained metal-free BP/g-$C_3N_4$ photocatalyst exhibits a long-term stability, high photocatalytic $H_2$ evolution efficiency from water, and good stability under visible light irradiation.

The present invention is illustrated in further details by the following non-limiting examples.

EXPERIMENTAL SECTION

Materials. BP crystals of high-purity (~99.998%) were purchased from Smart Elements, N-methyl-2-pyrrolidone (NMP, 99.5%, anhydrous), isopropanol (IPA, 99.5%, anhydrous), urea ($NH_2CONH_2$), nitric acid ($HNO_3$), N,N-dimethylformamide (DMF) and triethanolamine (≥99.0%) were purchased from Sigma-Aldrich and used as received without further purification. The ultrapure water (18.2 MΩ cm, 25° C.), obtained from a Millipore Ultrapure water system, was used throughout the current study.

Example 1—Ice-Assisted Preparation of BP Nanosheets. BP nanosheets were synthesized by developing a "NMP ice"-assisted exfoliation method. Specifically, 25 mg of bulk BP was ground into fine powder and dispersed into 25 mL of NMP solvent. The dispersion was completely frozen with a liquid nitrogen bath for 5-10 minutes, and then sonicated in a bath sonicator (BRANSONIC, 70 W, 40 KHz) for about 10 minutes to make the "ice" melt. The procedure of freezing and melting was repeated 3 times. To protect the BP from oxygen and water, the dispersion was sealed in a vial, and all the experimental manipulations were performed in a glovebox or with nitrogen bubbling. Afterwards, the dispersion was centrifuged at 7000 rpm for 15 minutes to remove the residual un-exfoliated BP. The light yellow supernatant was decanted gently, which was the dispersion of BP nanosheets in NMP. The obtained BP nanosheets were washed with IPA by centrifugation at 12000 rpm, 2 times. The collected precipitate was re-dispersed into 25 mL of IPA. The concentration of BP in this dispersion was determined to be 0.75 mg $mL^{-1}$ by Inductively Coupled Plasma Atomic Emission Spectroscopy (ICP-AES).

Example 2—Preparation of g-$C_3N_4$ Nanosheets. The g-$C_3N_4$ nanosheets were synthesized by our reported thermal polymerization method [12]. Generally, urea (30 g) was placed into a covered alumina crucible and then heated in a quartz tube furnace with a heating rate of 2° C. min-1 to 250, 350, and 550° C., and maintained at these three target temperatures for 1, 2, and 2 hours, respectively. After being naturally cooled down to room temperature, the yellow powder was collected and washed, three times with $HNO_3$ (0.1 mol $L^{-1}$) and water to remove potential alkaline residue (e.g., ammonia). After centrifugation, the precipitate was dried in the vacuum at 80° C. overnight.

Example 3—Preparation of BP/g-$C_3N_4$ Photocatalysts. BP/g-$C_3N_4$ nanosheets were prepared by dispersing 10 mg of g-$C_3N_4$ powder into 0.5 mL of BP nanosheets dispersion in IPA. The mixture was stirred for 2 hours to couple BP nanosheets with g-$C_3N_4$ nanosheets under the protection of $N_2$. Subsequently, the sample was collected by centrifugation at 6000 rpm for 5 minutes, and then washed completely with isopropanol. The final product was obtained by drying the washed sample in an oven under vacuum at 60° C. overnight.

Example 4—Characterization. A transmission electron microscope (TEM, JEOL 2100F), equipped with an energy-dispersive X-ray (EDX) spectrometer, was employed and operated at an accelerating voltage of 200 kV to study the microstructure and composition of the prepared samples. The topography image of the BP nanosheets on the pre-cleaned glass was observed by an atomic force microscopy (AFM, Bruker, MultiMode 8) in a tapping mode. Zeta potential of the as-prepared BP and g-$C_3N_4$ nanosheets in IPA was recorded with a Brookhaven ZetaPlus system in a standard 10 mm all-side-transparent polymethyl methacrylate cuvette. The crystalline structure was analyzed by an X-ray diffraction system (XRD, PANalytical X'Pert MRD, operated at 45 kV and 40 mA) with a Cu Kα radiation source (λ=0.15406 nm). X-ray photoelectron spectroscopy (XPS) was taken on a VG Escalab 220i-XL spectrometer equipped with a twin anode X-ray source. All the XPS spectra were calibrated with the C1s peak at 284.8 eV as reference. Ultraviolet photoelectron spectroscopy (UPS) measurements were carried out with an unfiltered Helium (21.22 eV) gas discharge lamp to determine the valence band (VB) position of the as-prepared BP and g-$C_3N_4$ samples. The UV-visible-near infrared (UV-vis-NIR) absorption spectra of the BP nanosheets dispersion and BP/g-$C_3N_4$ powder were obtained using a scan spectrometer (Varian Cary 5000). The concentration of BP nanosheets in IPA dispersion and the content of P in the composite samples were determined by an IRIS Intrepid II XSP ICP-AES (Thermal Scientific, USA).

Example 5—Photoelectrochemical Measurements. Photoelectrochemical (PEC) properties were measured with a standard three electrode system in an electrochemical workstation (CHI 660E, CH Instruments). The working electrode was prepared by coating the as-synthesized sample on fluorine-doped tin oxide (FTO) glass with its boundaries being protected by Scotch tape. Specifically, 2 mg of powder sample was dispersed into 2 mL of DMF under sonication for 30 minutes to obtain evenly dispersed slurry, which was drop-casted onto the FTO glass. After drying under ambient condition, the epoxy resin glue was used to isolate the uncoated part of the FTO glass. A Pt wire and a Ag/AgCl electrode were used as the counter and reference electrode, respectively. The 0.2 M of $Na_2SO_4$ (pH=6.8) aqueous solution pre-purged with nitrogen for 30 minutes was used as an electrolyte. A solar simulator equipped with an AM1.5G filter (LCS-100, Newport) was utilized as the light source. Nyquist plots were recorded over the frequency range of 100 mHz to 100 KHz at a bias of 0.2 V.

Example 6—Photocatalytic $H_2$ Evolution. Photocatalytic $H_2$ evolution experiment was performed in a 500 mL Pyrex top-irradiation reactor with a quartz cover. A 300 W Xenon lamp equipped with a cut-off filter (420 nm) was used to provide the irradiation source in the visible wavelength range. Typically, 10 mg of photocatalysts were dispersed in 100 ml of aqueous solution containing 10% of triethanolamine (TEOA) as sacrificial reagents. The mixture was deaerated by $N_2$ gas for 20 minutes and sonicated for 5 minutes. The system was sealed and vacuumed prior to photocatalysis. During the irradiation, the suspension was stirred continuously and kept at a constant temperature by circulating cooling water. The evolved $H_2$ was analyzed by a gas chromatography (GC, 7890B, Agilent Technologies) equipped with a thermal conductivity detector. For stability measurements, the photocatalysts were collected from the final reaction slurry by centrifugation, and then washed with ethanol and water thoroughly. Subsequently, the recycled sample underwent the photocatalytic $H_2$ evolution experiment under the identical conditions and repeated for 5 cycles with a total irradiation time of 120 hours.

Results and Discussions

Preparation of BP Nanosheets and BP/g-$C_3N_4$ Photocatalysts

To prepare BP nanosheets, bulk BP crystals are exfoliated in NMP using ice-assisted ultrasonication as outlined above in Example 3 above, and schematically illustrated in FIG.

1a. When the bulk BP powder is dispersed into NMP, the spaces between BP layers are filled with this solvent. As the melting point of NMP is −24° C., after being placed into direct contact with liquid nitrogen bath, the dispersion starts to freeze. The gradual growth of NMP ice crystals intercalates into BP layers to enlarge the interlayer spacing of BP, which reduces the interlayer Van der Waals interactions and will be favourable for the exfoliation process to generate BP nanosheets.

Figure 2:
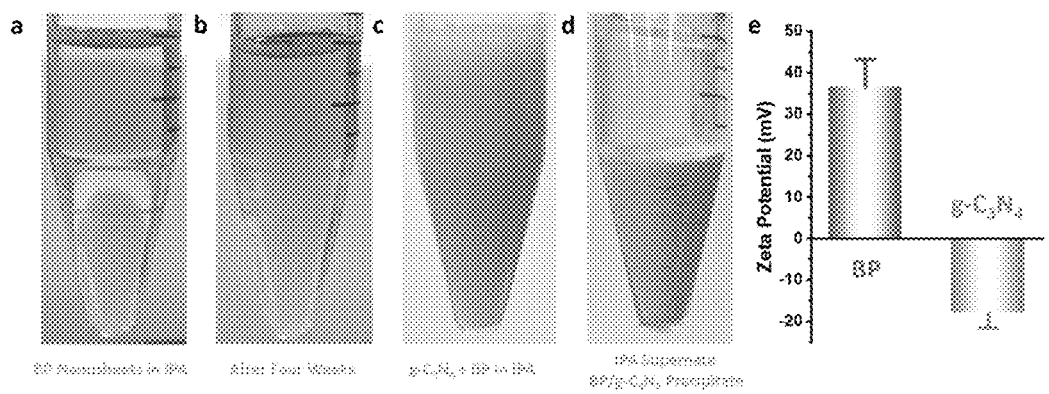
FIG. 2: Photographs of BP nanosheets in isopropanol (IPA) (a) at the first day, (b) after four weeks, (c) after adding g-$C_3N_4$, and (d) after the incubation at room temperature for 30 minutes. (e) The zeta potentials of BP and g-$C_3N_4$ nanosheets in IPA.
Figure 3:
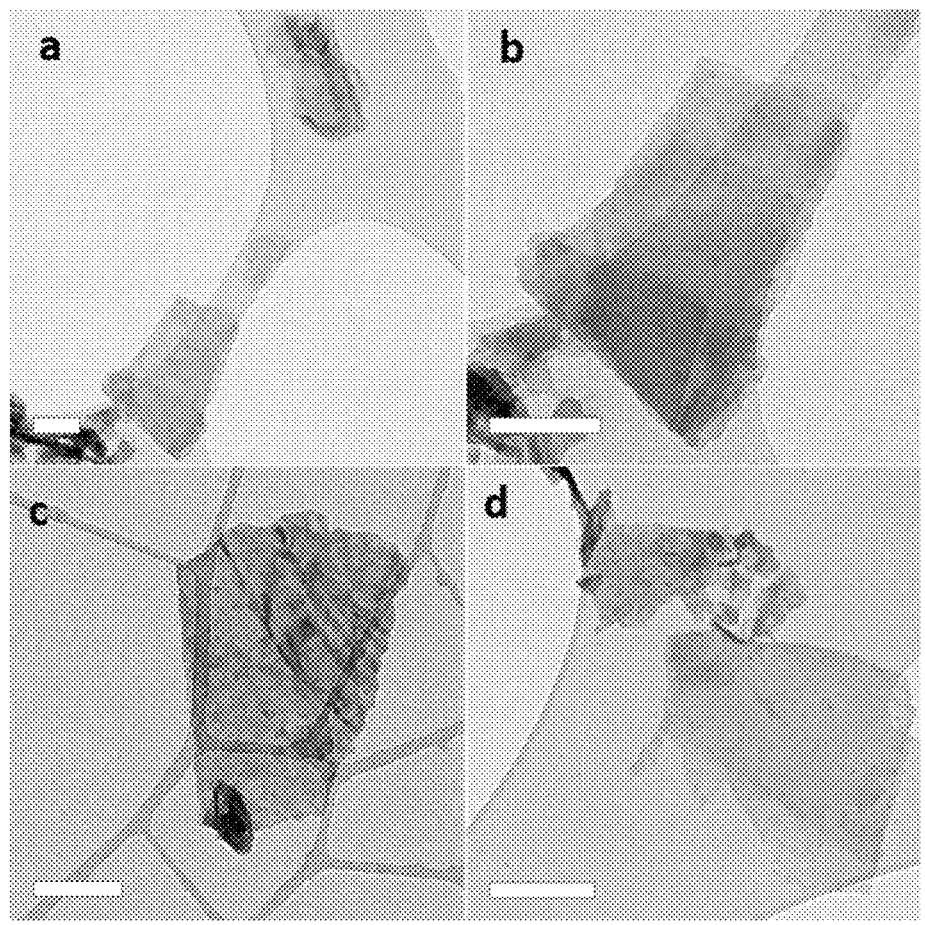
FIG. 3: P2p XPS spectra of BP and BP/g-$C_3N_4$ samples after water splitting under visible light irradiation for 24 hours.

Subsequently, the frozen dispersion undergoes ultrasonication, and the BP nanosheets are exfoliated from the bulk BP. The ultrasonic vibration of NMP ice between the layers also facilitates the exfoliation process. The required total time is less than 2 hours and the output power of the sonicator is less than 70 W. Compared with the conventional liquid phase exfoliation [8a, 8c, 10], both the processing time and the sonication power are reduced in the method according to the invention. As a result, the BP nanosheets obtained is a good quality, with larger lateral size and less anomalous structural defects are obtained [8a, 11]. Furthermore, the few-layer BP nanosheets are obtained in good yield. According to the ICP-AES analysis, 18.75 mg of few-layer BP nanosheets were obtained from 25 mg of bulk BP with the yield of 75%, which is higher than the values reported in the art; see Table 1 below. The obtained BP nanosheets dispersion in IPA is brown and is stable. Indeed, no aggregation or color change is observed during storage for over four weeks (FIGS. 2a-2b).

TABLE 1

Few-layer BP nanosheets yield with different exfoliation methods.

| | Sonication Bath | | Tip Sonicator | | Few-layer |
|---|---|---|---|---|---|
| Reference | Power (W) | Time (h) | Power (W) | Time (h) | BP yield |
| ACS Nano, 2015, 9, 8869 | 70 | 13 | | | 26% |
| Adv. Mater. 2016, 28, 510 | 380 | 20 | | | 30% |
| ACS Catal. 2016, 6, 8009 | — | 8 | | | 15% |
| J. Am. Chem. Soc. 2017, 139, 13234 | | | 10 | 4 | 20% |
| Angew. Chem. Int. Ed. 2018, 57, 1 | | | 10 | 4 | 20% |
| The invention | 70 | 2 | | | 75% |

To form the 2D-on-2D assembly, the g-$C_3N_4$ powder was introduced into the BP dispersion (FIG. 2c). The large amount of precipitate was soon observed at the bottom of the solution with the supernatant turning to colorless and transparent after the incubation at room temperature for 30 minutes (FIG. 2d), suggesting the successful integration and coupling of BP nanosheets with g-$C_3N_4$ nanosheets. FIG. 2e presents the zeta potentials of BP and g-$C_3N_4$ in IPA, which are positive and negative, respectively. A strong electrostatic interaction between them is noted. This contributes to their integration.

Morphological and Structural Characterization

The morphologies of the as-prepared BP nanosheets were characterized by TEM (FIG. 1b-1h). The typical TEM image of BP nanosheets shows a lamellar morphology with the lateral size of 50 nm-3 μm (FIG. 1b and FIGS. 3a-3d). Only the peaks of C, Cu and P elements were observed in the EDX spectrum (FIG. 1c), indicating that the pure BP without oxidation was obtained via the ice-assisted exfoliation method. The BP nanosheets thickness distribution was investigated using AFM height measurements (FIGS. 1d-f).

Lines 1 and 2 in FIG. 1d are randomly selected and their corresponding height profiles are displayed in FIG. 1e. Assuming the thickness of monolayer BP is 0.53 nm [6a, 6b, 8d], the number of layers of the generated BP nanosheets could be estimated from the AFM height measurements. FIG. 1f shows the statistical histogram of the number of BP layer distribution, which was obtained from the height profiles of 150 randomly selected individual BP nanosheets in AFM images. The mean number of layers was determined to be $<N>=5.9\pm1.5$, and about 93% of the observed BP nanosheets have the thickness of less than 10 nm.

Figure 4:
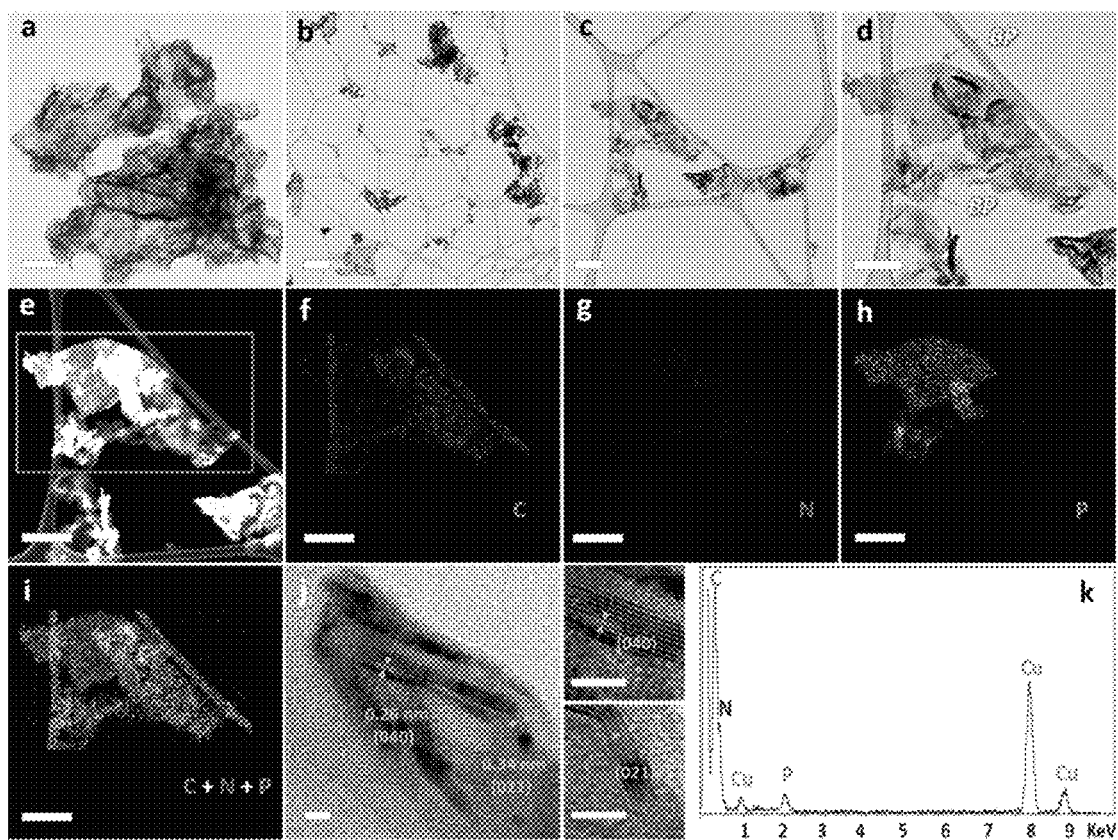
FIG. 4: Representative TEM images of (a) g-$C_3N_4$ and (b-d) BP/g-$C_3N_4$ with different magnifications. (e) High-angle annular dark field (HAADF) scanning TEM (STEM) image of (d), (f-i) STEM-EDX mapping of C, N, P, and the overlay of all the elements of the selected area in (e). (j) HRTEM image of BP/g-$C_3N_4$, and (k) EDX spectrum of (j). Scale bars: (a) and (c-i), 250 nm; (b), 1 μm; (j), 5 nm. The grid used in (a), (j) and (k) are carbon film on copper, and that used in the other figures is lacey carbon film on nickel.

The g-$C_3N_4$ shows a free-standing graphene-like wrinkled nanosheet structure (FIG. 4a). As displayed in FIGS. 4b-4d, the initial morphologies of BP and g-$C_3N_4$ nanosheets were not altered by their integration. The nanosheets marked with arrows in FIG. 4d are supposed to be BP considering their relatively regular edges, which are further corroborated by the high-angle annular dark field (HAADF) scanning TEM (STEM) image (FIG. 4e) and its corresponding STEM-EDX elemental mappings (FIGS. 4f-4i). The STEM-EDX mapping of C, N and P clearly confirms the co-existence of g-$C_3N_4$ and BP, and evidently shows the stacking of these two components. The high-resolution TEM (HRTEM) image reveals lattice fringes of 0.34 nm and 0.26 nm, attributed to the (021) and (040) planes of the BP crystals (FIG. 4j) [6e]. The presence of C, N and P peaks indicates the successful preparation of BP/g-$C_3N_4$ hybrid nanosheets with high purity and without detectable oxidative degradation (FIG. 4g), which is consistent with the STEM-EDX mapping results and is further verified by the following XPS analysis.

Figure 5:
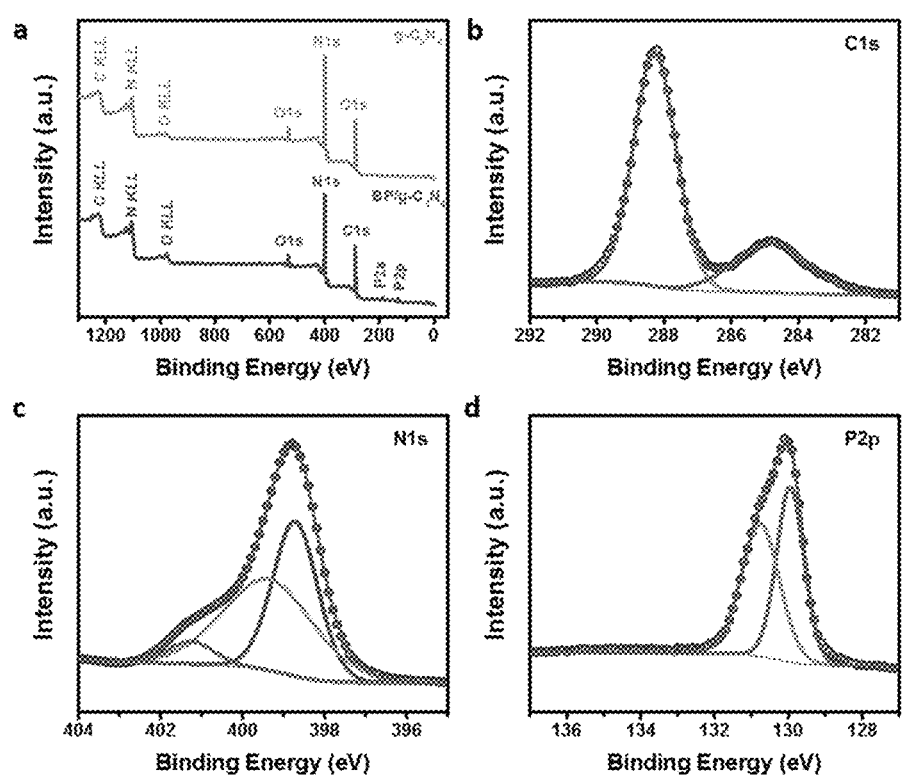
FIG. 5: (a) XPS survey spectra of g-$C_3N_4$ and BP/g-$C_3N_4$ nanosheets. High-resolution (b) C1s, (c) N1s, and (d) P2p XPS spectra of BP/g-$C_3N_4$ sample.

The composition and the chemical states of the as-prepared samples are assessed using XPS (FIG. 5). In the XPS survey spectra of BP/g-$C_3N_4$ (FIG. 5a), only the peaks assigned to C, N, O and P elements were observed, signifying the high purity of the prepared samples and the successful integration of BP and g-$C_3N_4$ nanosheets. As outlined above, O1s peak was observed in the XPS spectrum of g-$C_3N_4$, which is attributed to the O element in the adsorbed O2 or $H_2O$ on the sample surface [13]. The similar atomic O percentages of g-$C_3N_4$ (3.61%) and BP/g-$C_3N_4$ (3.59%) illustrates that no further oxidation occurred in the preparation of BP/g-$C_3N_4$ hybrid sample; see Table 2 below. In addition, the concentration of BP in BP/g-$C_3N_4$ nanosheets was detected to be 3.3% by XPS, which is quite close to that of 3.61% measured by ICP-AES and the nominal value of 3.75%.

TABLE 2

Atomic composition of g-$C_3N_4$ and BP/g-$C_3N_4$ photocatalysts.

| Sample | C atom (%) | N atom (%) | O atom (%) | P atom (%) |
|---|---|---|---|---|
| g-$C_3N_4$ | 46.71 | 49.68 | 3.61 | 0 |
| BP/g-$C_3N_4$ | 46.70 | 47.41 | 3.59 | 3.30 |

These results suggest the effective coupling between BP and g-$C_3N_4$ nanosheets. To specify the bond formation in the prepared BP/g-$C_3N_4$ sample, peak deconvolution was performed for the C1s, N1s and P2p XPS spectra (FIGS. 5b-5d). The high-resolution C1s XPS spectrum presents two distinct peaks at 284.8 and 288.3 eV (FIG. 5b), which can be assigned to the graphitic $sp^2$ C=C bonds in the surface adventitious carbonaceous environment and in the C—N aromatic heterocycles, respectively [4c, 14]. The main N1s peak was deconvoluted into three peaks (FIG. 5c), located at 398.6, 399.4 and 401.1 eV, which are assigned to the sp$^2$ hybridized N in triazine rings (C=N—C), tertiary N (N—(C)$_3$) and amino group (C—N—H), respectively [15]. As shown in FIG. 5*d*, the fitting result of P2p spectrum shows two peaks at binding energies of 129.8 and 130.9 eV, corresponding to P2p$_{3/2}$ and P2p$_{1/2}$, respectively. It is worth noting that the peak in the range of 133.5~134.0 eV, originating from oxidized P (P$_x$O$_y$) [7c, 7d, 16], was not observed in the P2p XPS spectrum, indicating that P was not oxidized during both the exfoliation of bulk BP to BP nanosheets and the preparation of BP/g-C$_3$N$_4$ hybrid sample. The time-efficient ice-assisted exfoliation method according to the invention plays an important role in protecting BP from oxidation by largely shortening the ultrasonication time and further reducing the possibility of exposure to O$_2$.

Figure 6:
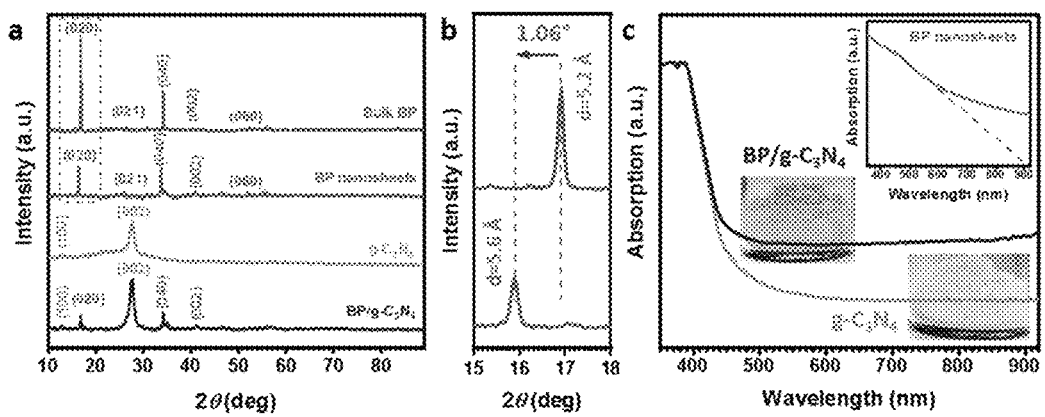
FIG. 6: (a) XRD patterns of bulk BP, BP nanosheets, g-$C_3N_4$ and BP/g-$C_3N_4$ samples. (b) Amplification of XRD patterns of bulk BP and BP nanosheets in the low-angle range which is marked by the dashed rectangle in (a). (c) UV-vis-NIR absorption spectra of BP nanosheets in IPA, and g-$C_3N_4$ and BP/g-$C_3N_4$ powder samples. Insets in (c) are the photos of g-$C_3N_4$ (bottom) and BP/g-$C_3N_4$ (top) powders.

FIG. 6 shows the XRD patterns of bulk BP, exfoliated BP nanosheets, g-C$_3$N$_4$ and BP/g-C$_3$N$_4$ samples. As illustrated in FIG. 6*a*, the diffraction peaks shown in the patterns of bulk BP and BP nanosheets can be indexed to the orthorhombic BP with space group Cmca (64) according to the standard pattern of BP (JCPDS No. 73-1358) [6d, 6f]. Furthermore, the low-angle peak originated from the periodic stacking of layers exhibits a downshift from 16.95° of the BP bulk counterpart to 15.89° of the exfoliated BP nanosheets, corresponding to the inter-plane distance increasing from the 5.2 Å to 5.6 Å, respectively (FIG. 6*b*). This result shows that intercalation of ice crystals can enlarge the inter-planar spacing of BP, and further benefit its exfoliation by reducing the interlayer Van der Waals interactions. In the XRD pattern of g-C$_3$N$_4$, the two peaks at 13.0° and 27.4° are ascribed to the in-planar arrangement of the tri-s-triazine unit and the inter-planar stacking of the conjugated aromatic system, respectively [2a, 4c, 12a, 15c, 17]. For the diffractogram of BP/g-C$_3$N$_4$ sample, both the characteristic diffraction peaks of BP and g-C$_3$N$_4$ were observed, explicitly confirming their successful integration once again.

The optical properties of BP nanosheets in IPA, g-C$_3$N$_4$ and BP/g-C$_3$N$_4$ nanosheets were investigated as displayed in the UV-vis-NIR absorption spectra (FIG. 6*c*). The BP nanosheets show a quite broad absorption band from UV to NIR regions with the absorption edge of 910 nm, corresponding to its bandgap of about 1.36 eV. The g-C$_3$N$_4$ exhibits a typical semiconductor-like absorption spectrum in the UV and blue regions with the absorption edge of around 459 nm, representing the bandgap of about 2.70 eV [2a, 12a]. For the BP/g-C$_3$N$_4$ 2D-on-2D assembled nanosheet photocatalyst, in addition to the absorption of g-C$_3$N$_4$, an enhanced tail absorption in the visible and NIR regions was observed due to the introduction of BP nanosheets. This can be propitious to the visible light-driven photocatalytic water splitting for H$_2$ production.

Photocatalytic H$_2$ Evolution

Figure 7:
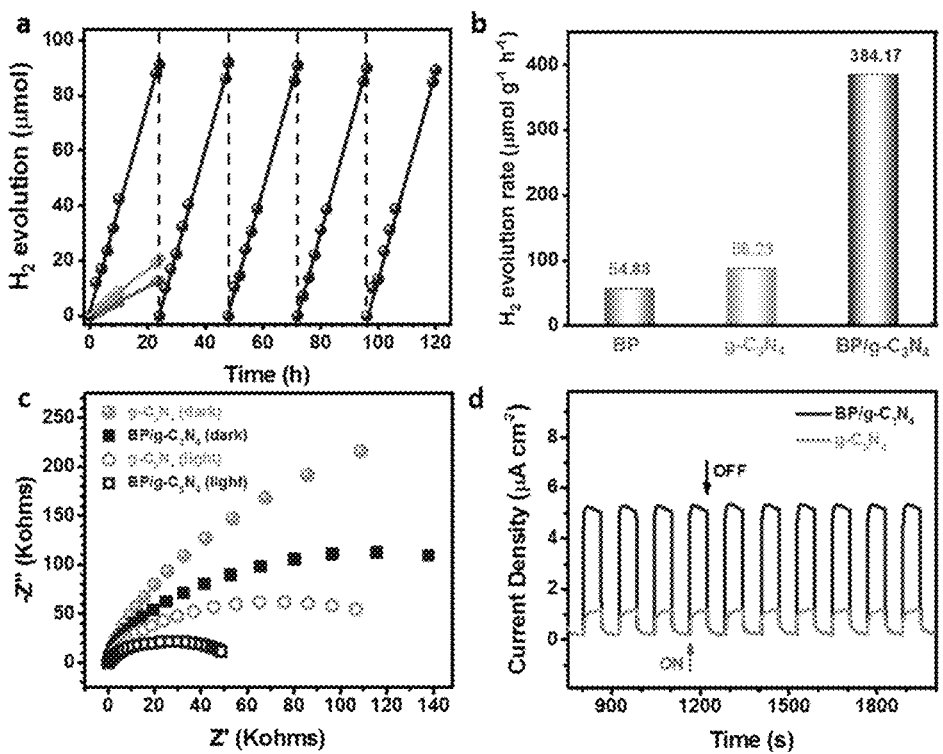
FIG. 7: (a) Photocatalytic water splitting for $H_2$ evolution and (b) $H_2$ evolution rate by BP (orange), g-$C_3N_4$ (blue) and BP/g-$C_3N_4$ (red) photocatalysts under visible light irradiation (λ>420 nm). (c) EIS Nyquist plots of g-$C_3N_4$ and BP/g-$C_3N_4$ with and without illumination. (d) Transient photocurrent density response of g-$C_3N_4$ and BP/g-$C_3N_4$ during light on/off cycles under a 0.2 V bias versus Ag/AgCl electrode.

The photocatalytic H$_2$ production from water splitting by BP, g-C$_3$N$_4$ and BP/g-C$_3$N$_4$ photocatalysts under visible light irradiation and the stability measurement of BP/g-C$_3$N$_4$ are shown in FIGS. 7*a*-7*b*. All the samples show H$_2$ evolution from water containing triethanolamine, which acts as the sacrificial electron donor to quench the photoinduced holes under visible light irradiation (λ>420 nm). The as-prepared BP/g-C$_3$N$_4$ photocatalyst exhibits much larger H$_2$ evolution amount (93.14 μmol), compared to that of BP (13.18 μmol) and g-C$_3$N$_4$ samples (20.43 μmol) after 24 hours of light irradiation.

As displayed in FIG. 7*b*, the highest H$_2$ evolution rate was achieved by BP/g-C$_3$N$_4$ (384.17 μmol g$^{-1}$ h$^{-1}$), which is about 7 times and 4.5 times higher than that of pure BP (54.88 μmol g$^{-1}$ h$^{-1}$) and g-C$_3$N$_4$ (86.23 μmol g$^{-1}$ h$^{-1}$). The fast recombination of photo-generated charge carriers in BP and g-C$_3$N$_4$ is probably responsible for their poorer activity. The integration of g-C$_3$N$_4$ and BP nanosheets improved the visible light photocatalytic activity in water splitting. The excited electrons in conduction band (CB) of g-C$_3$N$_4$ can be transferred to BP nanosheets and suppress the recombination of charge carriers in g-C$_3$N$_4$, and further enhance the photocatalytic activity. The H$_2$ production rate obtained by BP/g-C$_3$N$_4$ is comparable to or higher than that of the photocatalyst with the loading of precious metal as co-catalyst reported in the art; see Table 3 below.

TABLE 3

Photocatalytic H$_2$ production rate under visible light (λ > 420 nm) irradiation.

| References | Metal | Catalysts | H$_2$ evolution rate (μmol g$^{-1}$ h$^{-1}$) |
|---|---|---|---|
| Nat. Mater. 2009, 8, 76 | 3 wt % Pt | C$_3$N$_4$ | 106.94 |
| Chem. Mater. 2015, 27, 4930 | 1 wt % Pt | H$_2$ treated g-C$_3$N$_4$ | 29.63 |
| J. Catal. 2016, 342, 55 | 1 wt % Pt | g-C$_3$N$_4$ anatase/brookite TiO$_2$ | 29.97 |
| Appl. Catal., B 2016, 196, 112 | 3 wt % Pt | Br-modified g-C$_3$N$_4$ | 960 |
| Adv. Mater. 2017, 1700008 | 3 wt % Pt | crystalline CN nanosheets | 1060 |
| Appl. Catal., B 2018, 224, 1 | 3 wt % Pt | O-doped C$_3$N$_4$ nanorods | 732 |
| Science 2015, 347, 970 | free | CDots-C$_3$N$_4$ | 105 |
| Angew. Chem. Int. Ed. 2018, 57, 6 | free | BP/BiVO$_4$ | 160 |
| The invention | free | BP/g-C$_3$N$_4$ | 384.17 |

Figure 8:
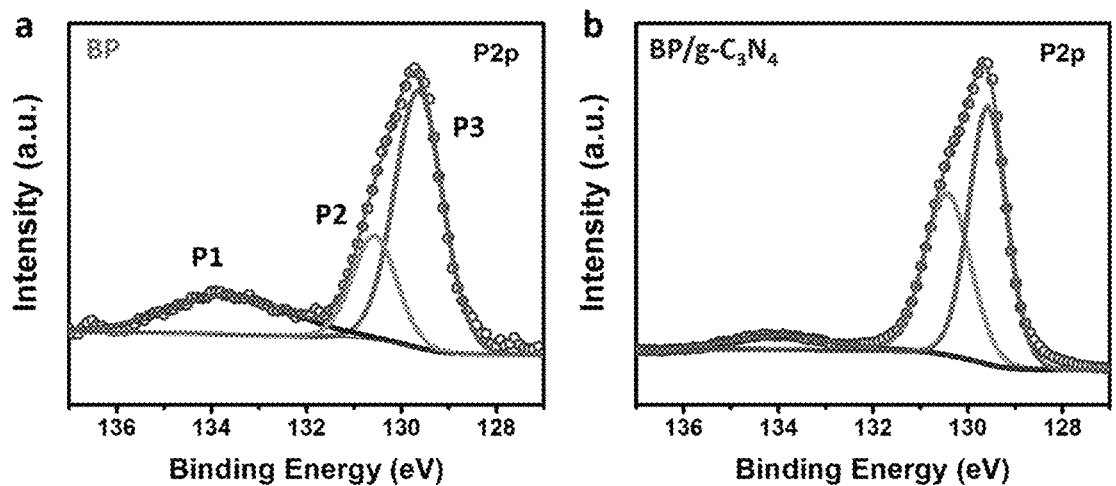
FIG. 8: P2p XPS spectra of BP and BP/g-$C_3N_4$ samples after water splitting under visible light irradiation for 24 hours.

Furthermore, only about 2% decrease was observed in the H$_2$ evolution by the as-synthesized BP/g-C$_3$N$_4$ photocatalyst after 120 hours of visible light irradiation, suggesting that it possesses good stability in water under light illumination. The XPS spectra of BP and BP/g-C$_3$N$_4$ after photocatalytic experiment were measured (FIG. 8). One additional peak at about 134 eV, assigned to the oxidized P, was observed in their P2p XPS spectra compared to the spectra before water splitting, which accounts for 21.64% and 7.56% in the three peaks of BP and BP/g-C$_3$N$_4$, respectively; see Table 4 below, indicating that the introduction of g-C$_3$N$_4$ inhibits the oxidation of BP. Though the P in BP/g-C$_3$N$_4$ was slightly oxidized, the photocatalytic activity was not distinctively affected. These results suggest that the as-prepared BP/g-C$_3$N$_4$ is an economic, efficient and stable, metal-free photocatalyst, without introducing any metal as co-catalyst, for H$_2$ evolution from water splitting under visible light.

TABLE 4

The atomic composition of P1, P2, and P3 of BP and BP/g-C$_3$N$_4$ photocatalysts in FIG. 8.

| Sample | P1 (%) | P2 (%) | P3 (%) |
|---|---|---|---|
| BP | 21.64 | 21.18 | 57.19 |
| BP/g-C$_3$N$_4$ | 7.56 | 39.86 | 52.57 |

PEC Measurements

The PEC properties of the as-prepared g-C$_3$N$_4$ and BP/g-C$_3$N$_4$ samples were evaluated by electrochemical impedance spectroscopy (EIS) and transient photocurrent responses (FIGS. 7c-7d). Some useful information for the charge transfer resistance can be shown in the high frequency region of Nyquist plots. The decreased arc radii were exhibited in the EIS Nyquist plots of BP/g-$C_3N_4$ compared to that of g-$C_3N_4$ both in the dark and under simulated solar light irradiation (FIG. 7c), suggesting that the introduction of BP leads to enhanced electronic conductivity and thus increase the interfacial charge transfer rate in BP/g-$C_3N_4$ sample [2d, 12a, 15c, 18].

To further verify the charge separation transfer performance, the transient photocurrent responses for more than ten light on-off cycles were measured under simulated solar light irradiation (FIG. 7d). The photocurrent density rapidly increases to a saturation value and remains constant once the light is switched on, and immediately returns to nearly zero when the light is turned off. The saturated photocurrent density of BP/g-$C_3N_4$ (about 5.28 µA cm-2) is about 4.8 times higher than that of plain g-$C_3N_4$ photocatalysts (about 1.11 µA cm-2). The increased photocurrent density shows that the introduction of BP nanosheets can increase the mobility, facilitate the separation or elongate the life time of the photo-generated charge carriers [2d, 19], and/or enhance the visible light absorption due to the narrower bandgap. Altogether they contribute to the improved photocatalytic $H_2$ evolution rate of water splitting under visible light irradiation. It is worth noting that almost no decrease in the photocurrent density was observed after about 2000 s of the light on-off tests, which shows that the as-synthesized g-$C_3N_4$ and BP/g-$C_3N_4$ samples possesses good stability under light irradiation.

UPS Measurement and Mechanism of Photocatalytic $H_2$ Evolution

Figure 9:
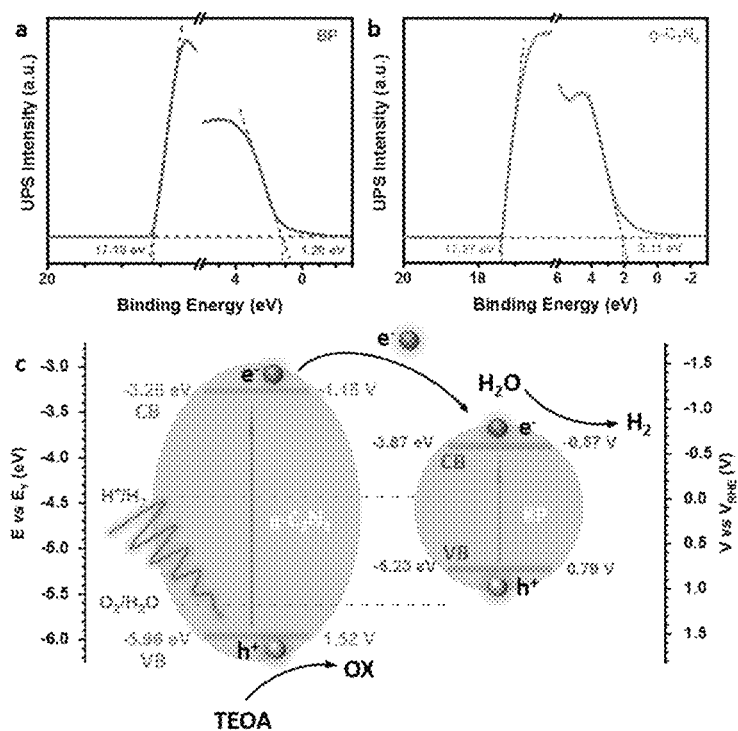
FIG. 9: Valence band UPS cut-off spectra of (a) BP and (b) g-$C_3N_4$ samples. (c) Schematic energy diagram of BP/g-$C_3N_4$ photocatalyst and proposed possible mechanism for the photocatalytic $H_2$ evolution from water splitting under visible light irradiation.

To better understand the nature of BP/g-$C_3N_4$ as an efficient photocatalyst for $H_2$ evolution, UPS measurements were performed to determine the energy levels of BP and g-$C_3N_4$ nanosheets (FIGS. 9a-9b). The intersections of the extrapolated linear portion at high and low binding energies with the baseline give the edges of the UPS spectra, from which the UPS widths of BP and g-$C_3N_4$ are determined to be 15.99 eV and 14.95 eV, respectively [14a]. Then the VB energy ($E_{VB}$) values of BP and g-$C_3N_4$ are calculated to be 5.23 eV and 5.96 eV, respectively, by subtracting the width of the UPS spectra from the excitation energy (21.22 eV). Combining with the measured bandgap energy ($E_g$) from the absorption spectra, the CB energy values ($E_{CB}$) of BP (3.87 eV) and g-$C_3N_4$ (3.26 eV) are estimated from $E_{CB}=E_{VB}-E_g$ [7c, 14a]. These values in eV are all converted to electrochemical energy potentials in V according to the reference standard for which-4.44 eV vs. vacuum level equals 0 V vs. reversible hydrogen electrode (RHE) [14a], which are all displayed in FIG. 9c.

Being based on the UPS measurement results, the possible mechanism for the largely enhanced photocatalytic activity in $H_2$ evolution of BP/g-$C_3N_4$ photocatalysts is proposed. As schematically illustrated in FIG. 9c, the CB energy level of BP is more negative than that of g-$C_3N_4$, and both are more positive than the reduction potential of $H^+/H_2$. In addition, the VB energy level of BP is higher than that of g-$C_3N_4$. These properly positioned bands are suitable for the transfer of charge carriers for water splitting, corroborating the capability of BP/g-$C_3N_4$ as a metal-free photocatalyst for $H_2$ evolution. Under visible light irradiation, mainly the electrons in the VB of g-$C_3N_4$ are excited to its CB, leaving behind the positive-charged holes in the VB. Afterwards, the excited electrons can be further transferred into the CB of adjacent BP, suppressing the recombination of charge carriers and promote the reduction of $H_2O$ to produce $H_2$. At the same time, the holes in the VB of g-$C_3N_4$ can be immediately captured by the hole-sacrificial agent TEOA to generate its oxide. In this process, BP plays a role as the electron sink to inhibit the charge carriers recombination and leads to efficient $H_2$ evolution under visible light irradiation, which is in agreement with the PEC measurement.

As will be understood by a skilled person, other allotropes of BP may be used as starting materials. Such materials which generally present a layered structure include but are not limited to red phosphorous (RP) and violet phosphorous (VP).

As will be understood by a skilled person, other organic solvents may be used in the ice-assisted process. Such solvents are suitably selected such as not to allow for any oxidation to occur. In particular, such solvents include but are not limited to alcohols such as methanol, ethanol and isopropanol (IPA), diethyl ether, chloroform, tetrahydrofuran, cyclohexane, toluene, dimethylformamide and the like, and combinations thereof, in addition to N-methyl-2-pyrrolidone (NMP).

As will be understood by a skilled person, other organic solvents may be used for the purification of the nanosheets formed, i.e., in the washing and re-dispersion steps. Such solvents are suitable selected to allow dispersion of the formed nanosheets. The solvent for these separations steps may be the same or different. Such solvents are suitably selected such as not to allow for any oxidation to occur. In particular, for example the solvents for the washing step include but are not limited to other alcohols such as methanol, ethanol, in addition to isopropanol (IPA); diethyl ether, chloroform, tetrahydrofuran, cyclohexane, toluene, dimethylformamide, and the like, and combinations thereof. And the solvents for the re-dispersion step include but are not limited to other alcohols such as methanol, ethanol, in addition to isopropanol (IPA); diethyl ether, chloroform, tetrahydrofuran, cyclohexane, toluene, dimethylformamide, N-methyl-2-pyrrolidone (NMP), and the like, and combinations thereof. Accordingly, as will be understood by a skilled person, the solvent used in the purification step (washing and/or re-dispersion steps) may be the same as the solvent used in the ice-assisted process.

As will be understood by a skilled person, any suitable 2D material may be coupled with the few-layer phosphorous nanomaterial according to the invention such as to obtain a photocatalyst. Such material may be poly (methyl methacrylate), graphene or hexagonal boron nitride which may be nitrogen-doped, molybdenum disulfide, a carbon nitride nanomaterial, and the like, in addition to graphitic carbon nitride (g-$C_3N_4$).

The scope of the claims should not be limited by the preferred embodiments set forth in the examples, but should be given the broadest interpretation consistent with the description as a whole.

The present description refers to a number of documents, the content of which is herein incorporated by reference in their entirety.

REFERENCES

[1] a) A. Fujishima, K. Honda, *Nature* 1972, 238, 37-38; b) K. Maeda, K. Teramura, D. L. Lu, T. Takata, N. Saito, Y. Inoue, K. Domen, *Nature* 2006, 440, 295-295; c) A. Kudo, Y. Miseki, *Chem. Soc. Rev.* 2009, 38, 253-278; d) Q. Zhang, D. Thrithamarassery Gangadharan, Y. Liu, Z. Xu, M. Chaker, D. Ma, *J. Materiomics* 2017, 3, 33-50.

[2] a) X. Wang, K. Maeda, A. Thomas, K. Takanabe, G. Xin, J. M. Carlsson, K. Domen, M. Antonietti, *Nat. Mater.*

2009, 8, 76-80; b) G. G. Zhang, Z. A. Lan, X. C. Wang, *Angew. Chem. Int. Ed.* 2016, 55, 15712-15727; c) H. H. Ou, P. J. Yang, L. H. Lin, M. Anpo, X. C. Wang, *Angew. Chem. Int. Ed.* 2017, 56, 10905-10910; d) D. Zheng, X. N. Cao, X. Wang, *Angew. Chem. Int. Ed.* 2016, 55, 11512-11516.

[3] J. S. Zhang, X. F. Chen, K. Takanabe, K. Maeda, K. Domen, J. D. Epping, X. Z. Fu, M. Antonietti, X. C. Wang, *Angew. Chem. Int. Ed.* 2010, 49, 441-444.

[4] a) X. F. Chen, J. S. Zhang, X. Z. Fu, M. Antonietti, X. C. Wang, *J. Am. Chem. Soc.* 2009, 131, 11658-11659; b) L. Sun, M. J. Yang, J. F. Huang, D. S. Yu, W. Hong, X. D. Chen, *Adv. Funct. Mater.* 2016, 26, 4943-4950; c) V. W.-h. Lau, I. Moudrakovski, T. Botari, S. Weinberger, M. B. Mesch, V. Duppel, J. Senker, V. Blum, B. V. Lotsch, *Nat. Commun.* 2016, 7; d) W. J. Ong, L. L. Tan, Y. H. Ng, S. T. Yong, S. P. Chai, *Chem. Rev.* 2016, 116, 7159-7329; e) J. Fu, J. Yu, C. Jiang, B. Cheng, *Adv. Energy Mater.* 2017, 1701503.

[5] a) Y. X. Deng, Z. Luo, N. J. Conrad, H. Liu, Y. J. Gong, S. Najmaei, P. M. Ajayan, J. Lou, X. F. Xu, P. D. Ye, *ACS Nano* 2014, 8, 8292-8299; b) L. Li, Y. Yu, G. J. Ye, Q. Ge, X. Ou, H. Wu, D. Feng, X. H. Chen, Y. Zhang, *Nat. Nanotechnol.* 2014, 9, 372-377; c) H. Liu, A. T. Neal, Z. Zhu, Z. Luo, X. F. Xu, D. Tomanek, P. D. Ye, *ACS Nano* 2014, 8, 4033-4041; d) E. S. Reich, *Nature* 2014, 506, 19; e) F. N. Xia, H. Wang, D. Xiao, M. Dubey, A. Ramasubramaniam, *Nat. Photonics* 2014, 8, 899-907; f) X. Ling, H. Wang, S. X. Huang, F. N. Xia, M. S. Dresselhaus, *PNAS* 2015, 112, 4523-4530; g) L. Z. Kou, C. F. Chen, S. C. Smith, *J. Phys. Chem. Lett.* 2015, 6, 2794-2805; h) H. Liu, Y. C. Du, Y. X. Deng, P. D. Ye, *Chem. Soc. Rev.* 2015, 44, 2732-2743; i) C. R. Ryder, J. D. Wood, S. A. Wells, Y. Yang, D. Jariwala, T. J. Marks, G. C. Schatz, M. C. Hersam, *Nat. Chem.* 2016, 8, 598-603.

[6] a) F. N. Xia, H. Wang, Y. C. Jia, *Nat. Commun.* 2014, 5, 4458; b) M. Buscema, D. J. Groenendijk, S. I. Blanter, G. A. Steele, H. S. J. van der Zant, A. Castellanos-Gomez, *Nano Lett.* 2014, 14, 3347-3352; c) J. Sun, G. Y. Zheng, H. W. Lee, N. Liu, H. T. Wang, H. B. Yao, W. S. Yang, Y. Cui, *Nano Lett.* 2014, 14, 4573-4580; d) H. Wang, X. Z. Yang, W. Shao, S. C. Chen, J. F. Xie, X. D. Zhang, J. Wang, Y. Xie, *J. Am. Chem. Soc.* 2015, 137, 11376-11382; e) Z. Sun, H. Xie, S. Tang, X. F. Yu, Z. Guo, J. Shao, H. Zhang, H. Huang, H. Wang, P. K. Chu, *Angew. Chem. Int. Ed.* 2015, 54, 11526-11530; f) X. Zhang, H. Xie, Z. Liu, C. Tan, Z. Luo, H. Li, J. Lin, L. Sun, W. Chen, Z. Xu, L. Xie, W. Huang, H. Zhang, *Angew. Chem. Int. Ed.* 2015, 54, 3653-3657; g) Y. Yang, J. Gao, Z. Zhang, S. Xiao, H. H. Xie, Z. B. Sun, J. H. Wang, C. H. Zhou, Y. W. Wang, X. Y. Guo, P. K. Chu, X. F. Yu, *Adv. Mater.* 2016, 28, 8937-8944.

[7] a) M. Z. Rahman, C. W. Kwong, K. Davey, S. Z. Qiao, *Energy Environ. Sci.* 2016, 9, 709-728; b) W. Y. Lei, T. T. Zhang, P. Liu, J. A. Rodriguez, G. Liu, M. H. Liu, *ACS Catal.* 2016, 6, 8009-8020; c) M. Zhu, S. Kim, L. Mao, M. Fujitsuka, J. Zhang, X. Wang, T. Majima, *J. Am. Chem. Soc.* 2017, 139, 13234-13242; d) M. S. Zhu, X. Y. Cai, M. Fujitsuka, J. Y. Zhang, T. Majima, *Angew. Chem. Int. Ed.* 2017, 56, 2064-2068; e) X. J. Zhu, T. M. Zhang, Z. J. Sun, H. L. Chen, J. Guan, X. Chen, H. X. Ji, P. W. Du, S. F. Yang, *Adv. Mater.* 2017, 29; f) W. Hu, L. Lin, R. Zhang, C. Yang, J. Yang, *J. Am. Chem. Soc.* 2017, 139, 15429-15436.

[8] a) A. H. Woomer, T. W. Farnsworth, J. Hu, R. A. Wells, C. L. Donley, S. C. Warren, *ACS Nano* 2015, 9, 8869-8884; b) A. Ziletti, A. Carvalho, D. K. Campbell, D. F. Coker, A. H. C. Neto, *Phys. Rev. Lett.* 2015, 114, 046801; c) J. Kang, J. D. Wood, S. A. Wells, J. H. Lee, X. L. Liu, K. S. Chen, M. C. Hersam, *ACS Nano* 2015, 9, 3596-3604; d) A. Favron, E. Gaufres, F. Fossard, A. L. Phaneuf-L'Heureux, N. Y. W. Tang, P. L. Levesque, A. Loiseau, R. Leonelli, S. Francoeur, R. Martel, *Nat. Mater.* 2015, 14, 826-832; e) A. Hirsch, F. Hauke, *Angew. Chem. Int. Ed.* 2017, 57, 4338-4354.

[9] a) J. D. Wood, S. A. Wells, D. Jariwala, K. S. Chen, E. Cho, V. K. Sangwan, X. L. Liu, L. J. Lauhon, T. J. Marks, M. C. Hersam, *Nano Lett.* 2014, 14, 6964-6970; b) R. A. Doganov, E. C. T. O'Farrell, S. P. Koenig, Y. T. Yeo, A. Ziletti, A. Carvalho, D. K. Campbell, D. F. Coker, K. Watanabe, T. Taniguchi, A. H. C. Neto, B. Ozyilmaz, *Nat. Commun.* 2015, 6; c) W. N. Zhu, M. N. Yogeesh, S. X. Yang, S. H. Aldave, J. S. Kim, S. Sonde, L. Tao, N. S. Lu, D. Akinwande, *Nano Lett.* 2015, 15, 1883-1890; d) Y. T. Zhao, H. Y. Wang, H. Huang, Q. L. Xiao, Y. H. Xu, Z. N. Guo, H. H. Xie, J. D. Shao, Z. B. Sun, W. J. Han, X. F. Yu, P. H. Li, P. K. Chu, *Angew. Chem. Int. Ed.* 2016, 55, 5003-5007.

[10] a) J. R. Brent, N. Savjani, E. A. Lewis, S. J. Haigh, D. J. Lewis, P. O'Brien, *Chem. Commun.* 2014, 50, 13338-13341; b) P. Yasaei, B. Kumar, T. Foroozan, C. H. Wang, M. Asadi, D. Tuschel, J. E. Indacochea, R. F. Klie, A. Salehi-Khojin, *Adv. Mater.* 2015, 27, 1887-1892; c) L. Chen, G. M. Zhou, Z. B. Liu, X. M. Ma, J. Chen, Z. Y. Zhang, X. L. Ma, F. Li, H. M. Cheng, W. C. Ren, *Adv. Mater.* 2016, 28, 510-517.

[11] M. Batmunkh, C. J. Shearer, M. J. Biggs, J. G. Shapter, *J. Mater. Chem. A* 2016, 4, 2605-2616.

[12] a) Q. Zhang, J. Deng, Z. Xu, M. Chaker, D. Ma, *ACS Catal.* 2017, 7, 6225-6234; b) Z. Xu, M. G. Kibria, B. AlOtaibi, P. N. Duchesne, L. V. Besteiro, Y. Gao, Q. Zhang, Z. Mi, P. Zhang, A. O. Govorov, L. Mai, M. Chaker, D. Ma, *Appl. Catal., B* 2018, 221, 77-85.

[13] a) F. Dong, Z. W. Zhao, T. Xiong, Z. L. Ni, W. D. Zhang, Y. J. Sun, W. K. Ho, *ACS Appl. Mater. Interfaces* 2013, 5, 11392-11401; b) Y. Q. Cao, Z. Z. Zhang, J. L. Long, J. Liang, H. Lin, H. X. Lin, X. X. Wang, *J. Mater. Chem. A* 2014, 2, 17797-17807.

[14] a) J. Liu, Y. Liu, N. Y. Liu, Y. Z. Han, X. Zhang, H. Huang, Y. Lifshitz, S. T. Lee, J. Zhong, Z. H. Kang, *Science* 2015, 347, 970-974; b) H. J. Kong, D. H. Won, J. Kim, S. I. Woo, *Chem. Mater.* 2016, 28, 1318-1324.

[15] a) C. Ye, J.-X. Li, Z.-J. Li, X.-B. Li, X.-B. Fan, L.-P. Zhang, B. Chen, C.-H. Tung, L.-Z. Wu, *ACS Catal.* 2015, 5, 6973-6979; b) J. Q. Zhang, X. H. An, N. Lin, W. T. Wu, L. Z. Wang, Z. T. Li, R. Q. Wang, Y. Wang, J. X. Liu, M. B. Wu, *Carbon* 2016, 100, 450-455; c) G. Peng, L. Xing, J. Barrio, M. Volokh, M. Shalom, *Angew. Chem. Int. Ed.* 2017, 56, 1-7; d) H. J. Yu, R. Shi, Y. X. Zhao, T. Bian, Y. F. Zhao, C. Zhou, G. I. N. Waterhouse, L. Z. Wu, C. H. Tung, T. R. Zhang, *Adv. Mater.* 2017, 29, 1605148.

[16] M. Zhu, Z. Sun, M. Fujitsuka, T. Majima, *Angew. Chem. Int. Ed.* 2018, 57, 1-6.

[17] a) D. J. Martin, P. J. T. Reardon, S. J. A. Moniz, J. W. Tang, *J. Am. Chem. Soc.* 2014, 136, 12568-12571; b) Q. Han, B. Wang, J. Gao, Z. Cheng, Y. Zhao, Z. Zhang, L. Qu, *ACS Nano* 2016, 10, 2745-2751.

[18] M. X. Li, W. J. Luo, D. P. Cao, X. Zhao, Z. S. Li, T. Yu, Z. G. Zou, *Angew. Chem. Int. Ed.* 2013, 52, 11016-11020.

[19] D. Shi, R. Zheng, M. J. Sun, X. Cao, C. X. Sun, C. J. Cui, C. S. Liu, J. Zhao, M. Du, *Angew. Chem. Int. Ed.* 2017, 56, 14637-14641.

The invention claimed is:

1. A method for preparing a few-layer phosphorous nanomaterial, comprising:
   (a) providing a bulk layer-structured phosphorous material;
   (b) grinding the bulk phosphorous material;
   (c) dispersing the grinded material into a first organic solvent to obtain a first dispersion in a sealed vial;
   (d) freezing the first dispersion for a period of time using liquid nitrogen, wherein organic solvent molecules are intercalated between layers of the material and interlayers are expanded;
   (e) melting the frozen dispersion via ultrasonication for a period of time to obtain a second dispersion, wherein forces are generated between intercalated organic ice crystals and the layers; and
   (f) submitting the second dispersion to a separation step, optionally involving centrifugation for a period of time, to obtain the nanomaterial,
   wherein the first organic solvent is selected from the group consisting of N-methyl-2-pyrrolidone (NMP), diethyl ether, chloroform, tetrahydrofuran, cyclohexane, toluene, dimethylformamide, and combinations thereof,
   and wherein the method is conducted in a glovebox or with nitrogen bubbling.

2. The method according to claim 1, further comprising:
   (g) washing the nanomaterial using a second organic solvent; and
   (h) dispersing the nanomaterial into a third organic solvent,
   wherein the second and third organic solvents are each independently selected from the group consisting of diethyl ether, chloroform, tetrahydrofuran, cyclohexane, toluene, dimethylformamide, and combinations thereof.

3. The method according to claim 1, wherein steps (d) and (e) are repeated a number of time, optionally 2 to 6 times, or 3 times, or 4 times.

4. The method according to claim 1, wherein the freezing time period at step (d) is 3-15 minutes, or 4-14 minutes, or 5-13 minutes, or 5-12 minutes, or 5-11 minutes, or 5-10 minutes, or 6-8 minutes.

5. The method according to claim 1, wherein the ultrasonication time period at step (e) is 5-15 minutes, or 6-14 minutes, or 7-13 minutes, or minutes 8-12 minutes, or 9-11 minutes, or 10 minutes.

6. The method according to claim 1, wherein the centrifugation at step (f) is performed at 7000 rpm and the time period is 10-20 minutes, or 12-18 minutes, or 14-16 minutes, or 15 minutes.

7. The method according to claim 1, wherein the bulk layered structure phosphorous material is black phosphorous (BP), red phosphorous (RP), or violet phosphorous (VP).

8. The method according to claim 1, wherein the bulk layer-structured phosphorous material is a black phosphorous (BP) material, and the few-layer phosphorous nanomaterial is a few-layer black phosphorous (BP) nanomaterial.

9. The method according to claim 1, wherein the first organic solvent comprises N-methyl-2-pyrrolidone (NMP).

10. The method according to claim 2, wherein the second and third organic solvents each independently comprises isopropanol (IPA).

11. The method according to claim 2, wherein the second and third organic solvents are the same.

12. The method according to claim 2, wherein the second and third organic solvents are different.

13. The method according to claim 1, wherein substantially no oxidation occurs.

14. The method according to claim 1, wherein the few-layer phosphorous nanomaterial is metal-free.

15. The method according to claim 1, wherein the few-layer phosphorous material has 4 to 10 layers.

* * * * *